(No Model.)
F. H. LEFROY.
CHANGEABLE GEAR FOR VEHICLES AND DRIVEN MECHANISM.
No. 584,377. Patented June 15, 1897.
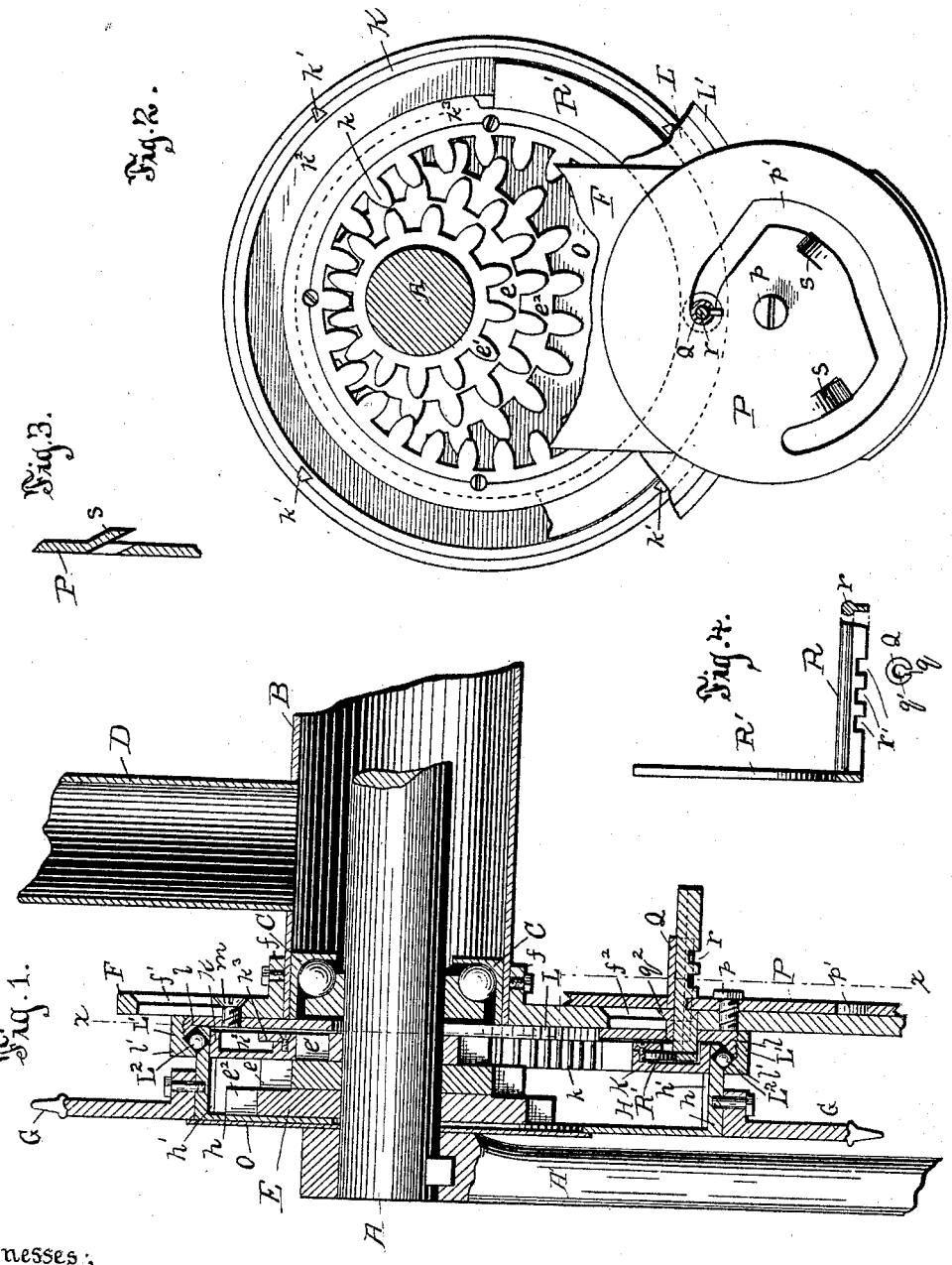
Witnesses:
Jos. H. Milans
Chas. W. Parker
Inventor:
Frank H. Lefroy,
By L. S. Bacon
Attorney.

United States Patent Office.

FRANK H. LEFROY, OF NEW YORK, N. Y., ASSIGNOR TO FRANCIS H. RICHARDS, OF HARTFORD, CONNECTICUT.

CHANGEABLE GEAR FOR VEHICLES AND DRIVEN MECHANISM.

SPECIFICATION forming part of Letters Patent No. 584,377, dated June 15, 1897.

Application filed March 13, 1896. Serial No. 583,106. (No model.)

*To all whom it may concern:*

Be it known that I, FRANK H. LEFROY, a citizen of the United States, residing at New York, in the county of New York and State of New York, have invented certain new and useful Improvements in Changeable Gear for Vehicles and Driven Mechanism; and I do hereby declare the following to be a full, clear, and exact description of the invention, such as will enable others skilled in the art to which it appertains to make and use the same.

This invention relates to an improvement in changeable gear for vehicles and driven mechanism, and it is embodied in the construction and arrangement of parts hereinafter described, and definitely pointed out in the claims.

The present invention is designed as an improvement on that class of gearing wherein a multogear is employed having associated therewith a power-transmitting member in the form of a sprocket or gear wheel; and the aim and purpose of the invention are to provide a strong and compact structure comprising an adjusting means which will enable a positive and accurate dual adjustment to be made by one operation, which will embody structural strength and simplicity, obviate the employment of a multiplicity of parts and delicate mechanism, and which will be adapted for adjustment to a machine with but slight alteration thereto.

I have conveniently shown my improvement applied to the crank-shaft of a bicycle, but I desire it understood that it is adapted for use in connection with a wheel-shaft and crank-shaft of any driven mechanism or device.

In the drawings, wherein like letters of reference designate corresponding parts in the several views, Figure 1 is a longitudinal vertical section of the device applied to a crank-shaft, showing parts in elevation. Fig. 2 is a sectional view on the line $x\ x$, Fig. 1, with parts broken away. Fig. 3 is a detail view of a part of the cam, and Fig. 4 is a detail view of the adjusting members.

In the drawings, A designates a crank-shaft having the crank A' thereon, B the sleeve, C the bearing, and D one of the standards of the frame, all of usual construction.

The bearing C is located a short distance from the crank A', and on the intermediate portion of the shaft is fixedly secured a multo or stepped gear E, consisting of the sections $e\ e'\ e^2$, each of a diameter different from that of the others.

F designates a rigid frame sleeved on the end of the sleeve B, having a flange $f$, bolted or otherwise secured to the sleeve. This frame or plate F extends above and below the sleeve and has the vertical guide-grooves $f'\ f^2$ therein on opposite sides of the sleeve, respectively.

G designates the driving member, which I have conveniently shown as a sprocket-wheel. This wheel is rigidly secured on a drum H, which latter is formed with a flange $h$, formed with a central opening, through which the shaft passes, and which is of a diameter greater than that of the section $e'$ of the gear E.

On the inner face of the rim of the drum is a series of four cleats or dovetailed guide-ribs $h'$, arranged equidistant apart.

K designates a ring-gear having internal teeth $k$ and formed on its periphery with the dovetailed or retaining grooves $k'$, in which the cleats or guides $h'$ work. The diameter of the ring is such as to closely but loosely fit within the drum H, and its width is substantially one-third that of the drum, so that the same may be moved transversely in the drum. The interior diameter of the ring K from the base of the teeth is substantially that of the section $e^2$ of the gear E, so that the ring and gear may be moved into mesh, as hereinafter described.

In the inner vertical face of the ring K is formed an annular channel $k^2$, and an annular ring-shaped locking-plate $k^3$ is inlaid into the ring, its inner edge projecting a short distance over the channel, for purposes presently to be stated.

To support the drum H, I employ a supporting-disk L, which is located at the inner edge of the drum and is of a diameter greater than that of the drum. The outer edge of the supporting-disk is formed with a lateral flange $l$, tapered or inclined on its under face and overlapping the periphery of the drum and constituting one section of a bearing for the drum. L' designates the other section of the bearing and, consists, conveniently, of a ring having an inwardly-extending inclined section $l'$ at its outer edge and a threaded inner section engaging the threads on the periphery of the disk L. A suitable annular groove is formed in the periphery of the drum registering with the groove formed by the flange of the disk and the ring $L'$ and constitutes, in connection with the said ring and disk-groove, the raceway for the bearing-balls $L^2$.

The disk L has an opening in its center corresponding with the opening in the flange of the drum, and it is carried by the frame or plate F through the instrumentality of the headed bolt $m$, passing through the slots $f'$ in the frame F and into the disk. By this manner of connection the disk L, ring K, and drum H may be moved jointly for a limited distance up and down.

It may be well to note that the supporting plate or frame acts as a closure for the opening in the disk L, the latter sliding on and arranged in close contact with the former. Dust is thereby prevented from gaining access to the gearing. A somewhat similar provision is made at the opposite side of the drum, wherein is employed a circular dust-plate O of a diameter greater than the opening in the flange $h$ of the drum and secured on the shaft between the gear E and crank.

To effect both a vertical and lateral adjustment of the ring K, drum H, and disk L, I conveniently employ the following mechanism: P is a circular wheel or disk journaled on a pin or shaft $p$, mounted in the lower portion of the supporting-frame F. This wheel or disk has a grooved periphery, around which a suitable actuating cord or chain may be passed. (Not shown.) The wheel P is formed with a cam-path $p'$, properly shaped as to pitch and contour to effect a step-by-step movement of the adjusting member engaging therein.

The adjusting device or member for effecting the vertical adjustment of the parts consists of a cylindrical pin or bar Q, having a channel $q$ in its under face extending its entire length, the inner portion of which is enlarged into a cylindrical chamber or groove $q'$. The inner end of the pin Q is passed through the slot $f^2$ in the support F, and is formed with a screw-thread which takes into a threaded opening in the disk L. A beveled flange $q^2$ is formed on the pin, which fits the outer face of the groove $f^2$ and serves to form the connection between the support F and disk L in a manner similar to the bolt above referred to. This pin Q passes into and through the cam-path of the plate P, and as the plate is turned the pin is made to follow in the path and respond in its movement to the various pitches of the path, thereby rising and falling at certain points, while at other points remaining stationary, as the plate P is moved.

To effect the transverse movement of the ring K, a flat sliding arm R is employed having a bead $r$ on its upper edge, which is located in the cylindrical portion of the channel in the pin Q. The arm extends below the plane of the pin and has three notches $r'$ formed in its under edge, within which one wall of the cam-path enters. On the outer end of the arm R is a yoke $R'$, comprising oppositely-extending curved arms, which are loosely fitted in the channel $k^2$ of the ring K and extend substantially above the plane of the center of the ring on opposite sides, thereby forming an extended connection between the arm and ring and holding the latter in proper position during adjustment to prevent binding or cramping. The yoke is held in the channel by the plate $k^3$, referred to.

On the wheel or disk P are struck up two inclined tongues $s$, formed at the bearing or moving wall of the cam-path, the same extending laterally a distance equal to the distance between the grooves $r'$ in the arm R. These inclined tongues are so arranged that as the ring L has been raised to a position to throw its teeth in line with the next larger gear $e'$ or $e^2$ the tongues will enter the adjacent groove $r'$, and, owing to their inclination, will carry that portion of the arm lying between the groove $r'$ through the opening in the wheel P, formed at the tongue, and thereby force the arm and ring one step outward and onto the alined gear, the ring sliding on the guides of the drum.

In operation, as the wheel P is turned the pin Q is raised or lowered, as the case may be, adjusting the ring to engage the gear. The ring is then moved laterally in the manner described and the engagement thereby effected.

It will be seen that a very positive and accurate adjustment can be effected and that the parts are of a relative strong and substantial nature, while the space occupied by the mechanism is of small extent. In fact, the mechanism can be readily applied to many existing machines.

While I have shown mechanism for effecting but three adjustments or variations, it is to be understood that any convenient number can be had by obvious changes.

I desire it understood that many changes and alterations can be made in the parts and substituted for those shown and described without in the least departing from the nature and principle of my invention.

Having thus described my invention, what I claim as new, and desire to secure by Letters Patent, is—

1. In a changeable gear for driving machinery, the combination with a shaft, of a multogear thereon, a driving-wheel, an internal gear connected therewith, and means for shifting the gear longitudinally of the shaft and independent of the drive-wheel and for shifting the drive-wheel and gear transversely of the shaft, substantially as described.

2. In a changeable gear for driving mechanism, the combination with a shaft, of a multogear thereon, a drive-wheel, an internal ring-gear loosely mounted on the wheel a fixed support, a sliding connection between the same and wheel, a rotary plate on the support having a cam-path therein, and inclined lips at the edge of the path, a pin connection between the cam and wheel, and a longitudinally-slidable arm connected to the internal gear-ring engaging in the cam-path and having notches in which the lips engage for effecting a longitudinal movement thereof, substantially as described.

3. In a changeable gear for driving mechanism, the combination with a frame and a shaft, of a multogear on the shaft, a drum surrounding the gear and of a diameter greater than the gear, a support on the frame, a slidable disk on the support, a bearing connection between the drum and disk, an internal gear loosely mounted on the interior of the drum, means for moving the drum, disk and gear transversely of the shaft, means for moving the internal gear longitudinally of the shaft and independent of the drum, and means for closing the drum against the ingress of dust, substantially as described.

In testimony whereof I affix my signature in presence of two witnesses.

FRANK H. LEFROY.

Witnesses:
J. BERNARD ENGLISH,
THEODORE WOOD.